US 6,727,959 B2

(12) United States Patent
Eskin

(10) Patent No.: US 6,727,959 B2
(45) Date of Patent: *Apr. 27, 2004

(54) SYSTEM OF AND METHOD FOR GAMMA CORRECTION OF REAL-TIME VIDEO

(75) Inventor: Michael A. Eskin, El Cajon, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,643

(22) Filed: Nov. 22, 1999

(65) Prior Publication Data

US 2003/0071923 A1 Apr. 17, 2003

(51) Int. Cl.⁷ .................... H04N 5/20; H04N 5/202
(52) U.S. Cl. ................. 348/674; 348/254; 345/602
(58) Field of Search ................. 348/254, 255, 348/256, 671, 674, 675, 676, 677; 358/519; 382/254; 345/602; H04N 5/20, 5/202

(56) References Cited

U.S. PATENT DOCUMENTS

| 5,196,924 | A | * | 3/1993 | Lumelsky et al. | 348/674 |
|---|---|---|---|---|---|
| 5,278,966 | A | * | 1/1994 | Parks et al. | 711/5 |
| 5,351,067 | A | * | 9/1994 | Lumelsky et al. | 345/519 |
| 5,398,076 | A | * | 3/1995 | Lum et al. | 348/675 |
| 5,469,275 | A | * | 11/1995 | Edgar | 358/406 |
| 5,589,889 | A | * | 12/1996 | Kawaoka | 348/671 |
| 5,710,594 | A | * | 1/1998 | Kim | 348/254 |
| 6,266,103 | B1 | * | 7/2001 | Barton et al. | 348/674 |
| 6,304,300 | B1 | * | 10/2001 | Warren et al. | 348/254 |
| 6,404,512 | B1 | * | 6/2002 | Tone | 358/3.01 |
| 6,563,963 | B1 | * | 5/2003 | Nacman et al. | 382/298 |

OTHER PUBLICATIONS

Poynton, "Gamma" Ch. 6 from the book *A Technical Introduction to Digital Video* published by John Wiley & Sons (1996), pp. 91–114.

* cited by examiner

*Primary Examiner*—John Miller
*Assistant Examiner*—Brian Yenke
(74) *Attorney, Agent, or Firm*—Howrey, Simon, Arnold & White, LLP

(57) ABSTRACT

A system and method for performing real-time gamma correction of video in which a pixel having multiple components, e.g., RGB components, can be gamma corrected through a single access to a lookup table.

31 Claims, 15 Drawing Sheets

SYSTEM OF AND METHOD FOR GAMMA CORRECTION OF REAL-TIME VIDEO

BACKGROUND OF THE INVENTION

1. Field of the Invention

The present invention relates generally to real-time video display systems, and more particularly, to a system of and method for gamma correction of real-time video in such systems.

2. Related Art

The convergence of video and computer technology is proceeding at a rapid pace. A large number of new applications have emerged from this convergence, such as: 1) video help windows that accompany most software programs today; 2) video e-mail; 3) video teleconferencing; 4) video notes within a document; 5) viewing one or more channels of television on a PC monitor, while simultaneously using the computer to run traditional applications; 6) video editing; 7) video tutorials and interactive teaching; 8) playing back video clips that have been stored on a hard drive, CD ROM or network drives; and 9) video streaming over the Internet. Many of these applications involve real-time display of digitized video on all or a portion of a display medium or screen, possibly while the remaining portions of the screen display graphics and text from other applications that are being executed in parallel.

Most computer monitors exhibit a non-linear relationship between input voltage and output intensity according to which the output intensity is equal to the input voltage raised to the power of a numerical parameter called gamma. In other words, the output intensity, I, bears the following relationship to V, the input voltage, and $\gamma$, gamma: $I=V^{\gamma}$. Curve 204 of FIG. 3A illustrates an example of this relationship. This non-linearity results in a washed out appearance of the display. A typical value for gamma is 2.5, but the actual value may differ for a specific monitor or display. Values ranging from 2.3 to 2.6 are not uncommon.

In many monitors, a process called gamma-correction is employed in an effort to correct for this non-linearity. According to one approach, gamma-correction is sought to be accomplished by pre-compensating the input voltage to counteract the non-linear effect introduced by the monitor. According to this approach, the input voltage is pre-compensated by raising it to a power given by the inverse of gamma. Curve 206 of FIG. 3B illustrates an example of the relationship between input voltage and corrected or pre-compensated input voltage. Mathematically, this process can be represented as follows: $V'=V^{1/\gamma}$, where V and $\gamma$ are as defined before, and V' is the pre-compensated input voltage. That way, when the non-linearity of the monitor is factored in, the relationship between I, the output intensity, and V, the input voltage, is linear. This can be seen mathematically as follows: $I=V'^{\gamma}=(V^{1/\gamma})^{\gamma}=V$. Curve 202 of FIG. 3C illustrates an example of this linear relationship.

Typically, an effort is made to use a gamma for pre-compensation that is the same as the gamma of the monitor involved. However, there may be applications in which the gamma used for pre-compensation deviates from that of the monitor. For example, in order to help viewing in dimly lit environments such as the home, NTSC video signals are typically gamma-corrected using a gamma of 2.2, although typical display monitors have a gamma in the range of 2.35–2.55. In brightly lit environments, however, such as the office, a gamma of 1.1–1.2 is often employed for gamma correction. Furthermore, although PAL standards specify a gamma of 2.8, a value of 2.2 is typically used.

Moreover, there are cases in which it is desirable to vary the value of gamma depending on the content of the video display. In one example, video is gamma corrected using a gamma value of 2.2–2.3, while computer graphics are gamma corrected using a gamma value of 2.5.

It is difficult to gamma correct the voltage values on the fly in software through suitable multiplication operations on each pixel. The reason is this approach is computationally intensive and the desired effect is difficult, if not impossible, to achieve in the time available. Consider a typical video display in which video is digitized at 9,216,000 pixels per second, representing 640×480 pixels per frame @30 frames/second. Each pixel may have three color components, red, blue, and green, each of which must be pre-compensated. Consequently, 27,648,000 multiply operations per second would be required, not to mention the related retrieval and storing operations. Such is impossible to achieve with current commercially available microprocessors.

Consequently, current approaches for gamma correction have centered around hardware implementations in which the voltage values are gamma corrected in hardware through lookup tables stored in RAMDACS, one for each color component. Unfortunately, this approach has drawbacks in that all the pixels in a frame are gamma compensated using the lookup tables, which are pre-computed using the same value of gamma. Consequently, there is no mechanism provided for gamma correcting different portions of the pixels in a frame based on content, i.e., graphics vs. video. Since the system is typically calibrated for graphics, this means the graphics is calibrated correctly but the video tends to look "washed out" due to poor gamma-correction.

Accordingly, there is a need for a system of and method for gamma correction that is computationally efficient and thus able to perform gamma correction within the time constraints imposed by a real-time environment.

There is also a need for a system of and method for gamma correction that is able to perform gamma correction based on content, i.e., video as opposed to graphics.

There is also a need for a system of and method for gamma correction that overcomes one or more of the disadvantages of the prior art.

The objects of the subject invention include fulfillment of any of the foregoing needs, singly or in combination.

Additional objects and advantages will be set forth in the description which follows, or will be apparent to those of ordinary skill in the art who practive the invention.

SUMMARY OF THE INVENTION

In accordance with the invention as broadly described herein, there is provided a system comprising: (a) a source of pixels; (b) a gamma corrector that gamma corrects the pixels utilizing at least one lookup table; and (c) a storage device for storing the corrected pixels. In one configuration, the system is a video system, and the source is a source of video pixels. In one implementation, a display is also provided for displaying the corrected pixels stored in the storage device.

In one implementation, the storage device is a disk. In another implementation, the storage device is a memory. In yet another implementation, the storage device is a frame buffer for a display.

Advantageously, the lookup table contains a corrected pixel for substantially all possible pixel values. Each pixel is advantageously used to index and retrieve the corresponding corrected pixel from the lookup table in a single lookup.

Each of the corrected pixels is then stored in the corresponding location in the storage device. In the implementation in which the storage device is a frame buffer for a display, the contents of the frame buffer may then be displayed.

In one implementation example, a pixel comprises a plurality of components, such as red (R), green (G), and blue (B) components, and a single entry in the lookup table contains a corrected value for each of the R, G, and B components of the pixel. Through a single access to the lookup table, the corrected values for each of the pixel components can be retrieved and corrected. The advantage of this implementation example is that each of the components of a pixel can be corrected through a single access to the lookup table. This facilitates real-time video applications of the system in which video pixels can be corrected in real time.

In one configuration, the gamma corrector is implemented in the form of software. In other configurations, it is implemented in hardware, or a combination of hardware and software.

In one implementation, the source is a source of video pixels. In one implementation example, the video source comprises an analog video source and a video decoder. The video decoder digitizes the analog pixels from the analog video source. The digitized pixels are output onto a bus. The lookup table resides in a storage device that is also connected to the bus. A microprocessor or other controller uses the digitized pixels to index the table, and obtain therefrom corrected pixels. The corrected pixels are read out onto the bus and sent to a graphics card that includes a frame buffer for storage of the corrected pixels.

In a second embodiment, the system further comprises a gamma selector for providing a selected gamma value. Responsive thereto, the lookup table is pre-computed. An advantage of this embodiment is that the lookup table can be varied responsive to the particular gamma value which characterizes a particular display.

In a third embodiment, multiple content sources, including a first source and a second source, are configured to provide pixels to the storage device. The pixels from the first source, which may represent video, are gamma corrected before storage in the storage device, and the pixels from the second source, which may represent graphics or even another video source, may be uncorrected, or corrected in accordance with a different gamma value than that used to correct the pixels from the first source. An advantage of this embodiment is that pixels from the first source need not be gamma corrected using the same value of gamma as the pixels from the second source, and flexibility is provided to correct these pixels with a different value of gamma than that used to correct the pixels from the second source.

A method of gamma correcting a plurality of pixels is provided which comprises the following steps: (a) receiving the pixels; (b) using each of the pixels to index a lookup table; (c) responsive thereto, retrieving corrected pixels from the lookup table; and (d) storing the corrected pixels. In one implementation, the method further comprises the step of displaying the corrected pixels.

A method of pre-computing a lookup table for gamma correcting pixels is provided which comprises the following steps: (a) receiving a selected gamma value; and (b) responsive thereto, pre-computing the lookup table.

A second embodiment of a method of gamma correcting pixels comprises the following steps: (a) gamma correcting a first group of pixels; (b) storing the corrected first group of pixels; (c) gamma correcting a second group of pixels using a value of gamma which may differ from that used to correct the first group; (d) storing the corrected second group of pixels. In one implementation, the first group of pixels are video pixels. In another implementation, the method further comprises the step of displaying the corrected first and second groups of pixels.

A third embodiment of a method of gamma correcting pixels comprises the following steps: (a) gamma correcting a first group of pixels; (b) displaying the corrected first group of pixels and a second group of pixels; (c) updating the first group of pixels; and (d) repeating the foregoing method with the updated first group of pixels. The second group of pixels may either be uncorrected or gamma-corrected using the same or different value of gamma than used to correct the first group of pixels. In one implementation, the first group of pixels are video pixels. In one implementation example, the second group of pixels are graphics pixels.

Further features and advantages of this invention as well as the structure and operation of various embodiments are described in detail below with reference to the accompanying drawings.

BRIEF DESCRIPTION OF THE DRAWINGS

The present invention is described with reference to the accompanying drawings.

DETAILED DESCRIPTION OF THE INVENTION

Figure 1A:
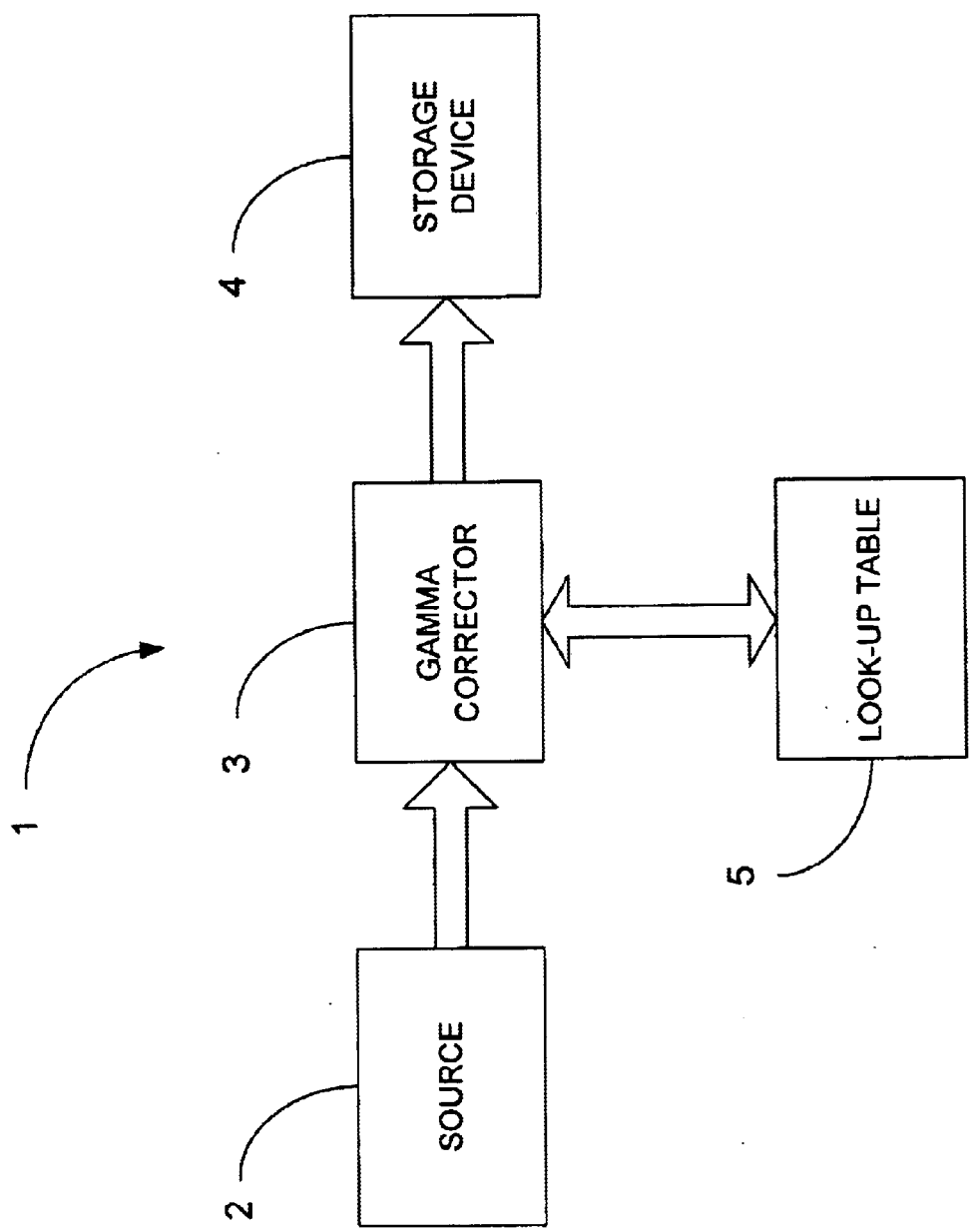
FIG. 1A is a block diagram of a first embodiment of the present invention.

A first embodiment of a system 1 in accordance with the subject invention is shown in FIG. 1A. As shown, this embodiment of the system comprises source 2, gamma corrector 3, storage device 4, and lookup table 5. The source 2 provides successive groups, blocks or frames of pixels. In one implementation, a pixel is an input voltage value for a particular element of a display. The voltage value may be uncorrected or gamma corrected. In one implementation example, each pixel comprises three voltage values, one for each of the RGB components of the pixel.

The gamma corrector 3 successively receives the frames of pixels and successively gamma corrects them using loop-up table 5. The lookup table 5 advantageously contains entries for all or substantially all of the possible pixel values. Each entry corresponds to a pixel value, and comprises a gamma corrected rendering of that value. To gamma correct a pixel value, gamma corrector 3 retrieves the entry in the look-up table corresponding to the pixel value, and then stores the corrected value in the corresponding location of the storage device. Gamma corrector 3 successively performs this process for all or substantially all the pixels provided by source 2. Optionally, a display is also provided for successively displaying the frame of corrected pixels stored in the storage device.

In one configuration, the system 1 is a video system, and the source 5 is a video source. In one implementation, a pixel comprises a plurality of components, such as, for example, red (R), blue (B), and green (G) components, and a single entry in the lookup table contains corrected values for each of the components of the pixel represented by the entry. Consequently, through a single access to the lookup table, each of the components can be corrected.

In one implementation example, the storage device is a disk; in another, it is a memory. In yet another implementation, it is a frame buffer for a display.

In one configuration, the gamma corrector 3 is implemented in software, that is, a series of steps stored in a computer readable medium, and executable by a computer, processor, microprocessor or the like. In another configuration, gamma corrector 3 is implemented in hardware or a combination of hardware and software.

Figure 1B:
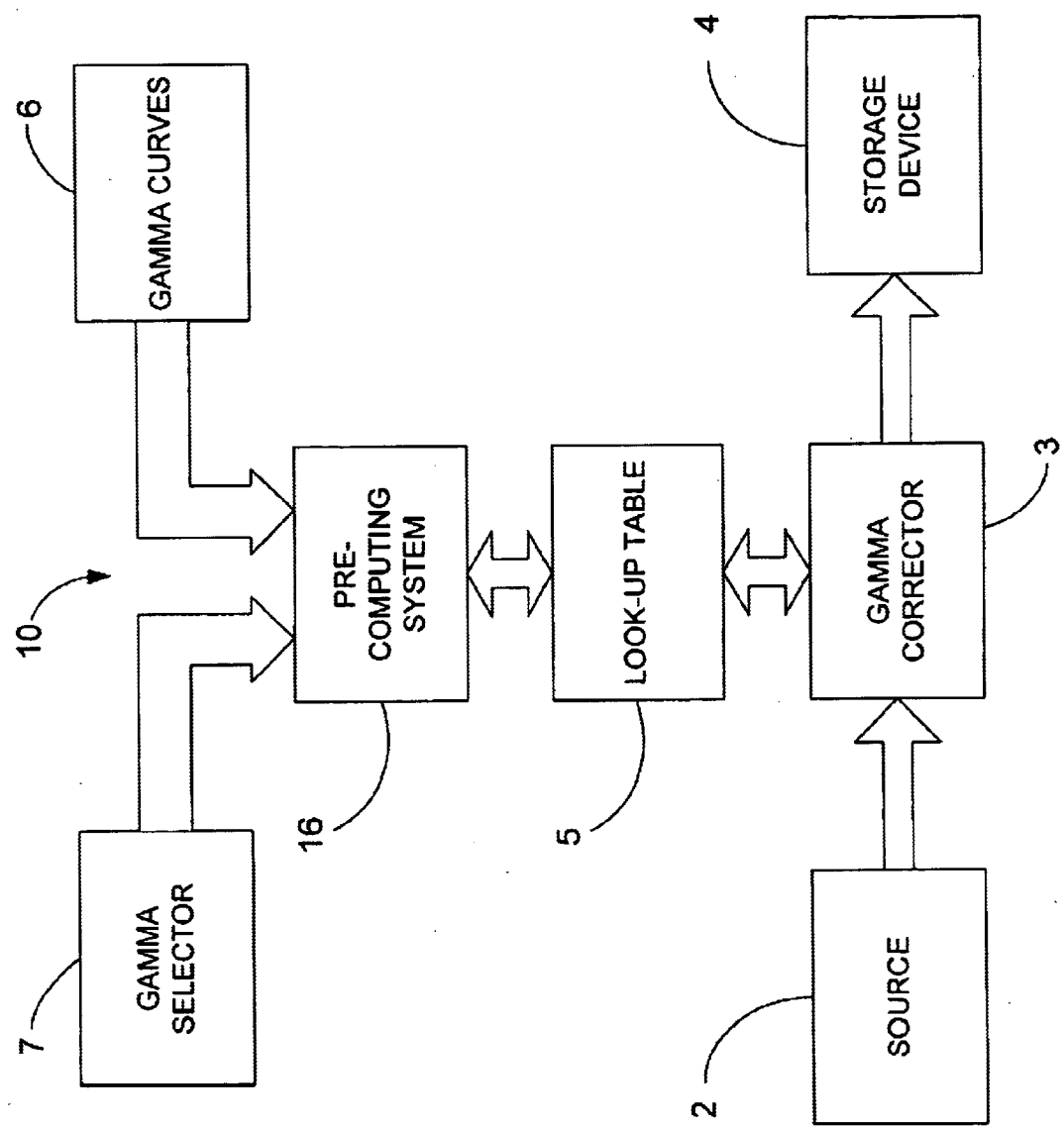
FIG. 1B is a block diagram of a second embodiment of the present invention.

A second embodiment of the subject invention is shown in FIG. 1B in which, compared to FIG. 1A, like elements are referenced with like identifying numerals. In this embodiment, system 10 is provided comprising a source 2, gamma corrector 3, lookup table 5, and storage device 4 which are configured as in the first embodiment. In addition to that, gamma selector 7, gamma curves 6, and pre-computing system 16 are also provided.

Figure 3A:
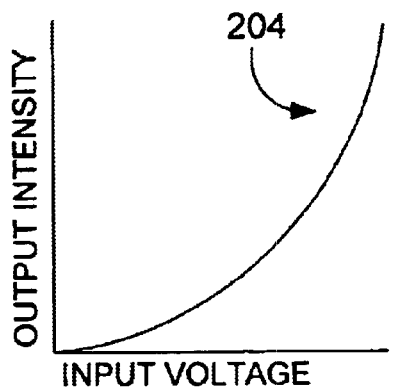
FIG. 3A is a curve illustrating an example relationship between input voltage and output intensity for a display.
Figure 3B:
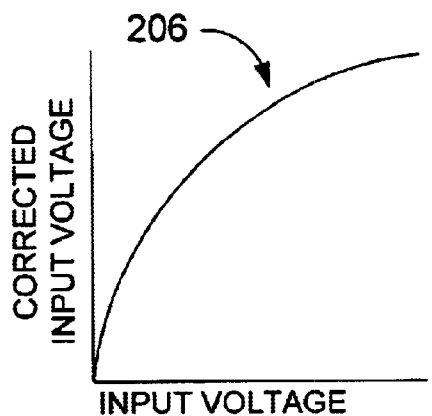
FIG. 3B is a curve illustrating an example relationship between input voltage and corrected input voltage.
Figure 3C:
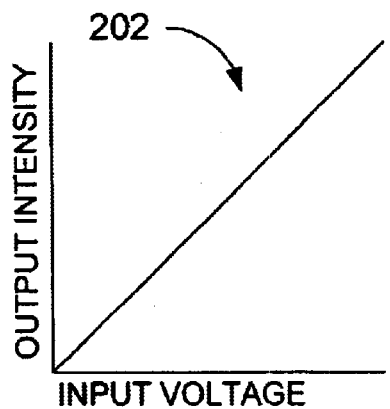
FIG. 3C is a diagram illustrating the linear relationship between input voltage and output intensity which ensues through use of the subject invention.

In this embodiment, the pre-computing system 16 pre-computes lookup table 5 responsive to a selected gamma value provided by gamma selector 7 using one or more of the gamma curves 6. Each of the gamma curves 6 is advantageously of the form illustrated in FIG. 3B, and embodies a relationship between input voltage and corrected input voltage for a particular value of gamma. The pre-computing system 16 obtains the one or more gamma curves which embody this relationship for the selected gamma value provided by gamma selector 7, and uses one or more these curves to pre-compute the lookup table 5.

Advantageously, the lookup table contains an entry for all or substantially all of the pixel values. For each of the pixel values to be represented in the table, the pre-computing system 16 determines, using the one or more curves, the corrected rendering of this pixel value, and then stores the same in corresponding entry of the table.

In one implementation, in which a pixel comprises a plurality of components, such as R, G, and B components, a separate gamma curve may be provided for each or some of the components. This is advantageous for the case in which some or all of the components differ by data resolution or some other parameter. In this implementation, for each pixel value represented or to be represented in the table, the pre-computing system uses these curves to separately pre-compute the corrected value for each of the components. The corrected values for each of the components are then combined to form a single entry in lookup table 5, and the corrected value then stored in the corresponding location in the table.

Figure 4A:
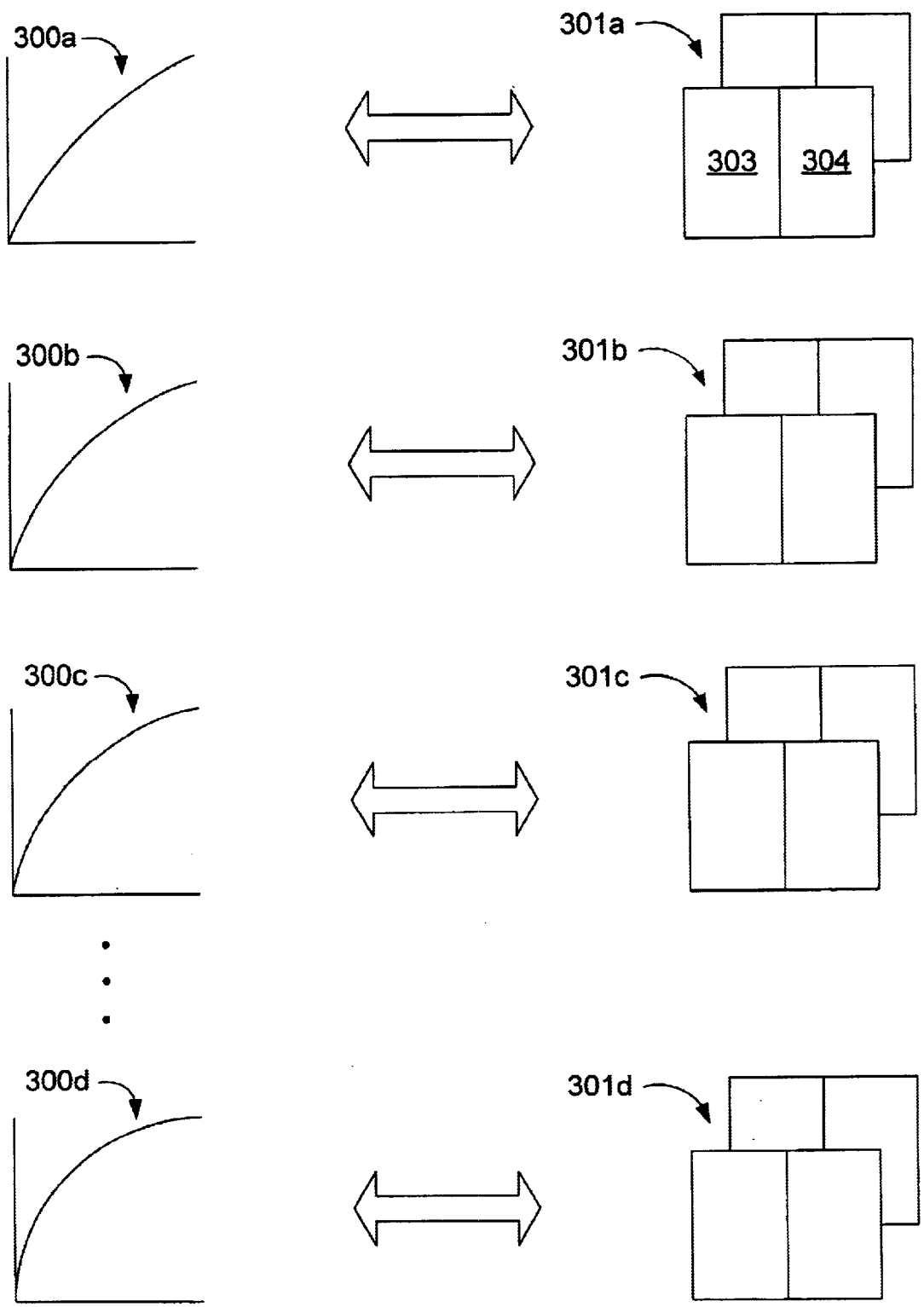
FIG. 4A is a diagram illustrating the implementation of gamma correction curves as lookup tables in accordance with one implementation of the subject invention.

In one implementation example, the gamma curves 6 are themselves implemented in the form of second lookup tables, each of which corresponds to a particular gamma value particular and data resolution. This implementation of the gamma curves is illustrated in FIG. 4A, in which numerals 300a, 300b, 300c, and 300d identify gamma curves of the form illustrated in FIG. 3B, each corresponding to a different value of gamma, and in which numerals 301a, 301b, 301c, and 301d respectively identify the corresponding second lookup tables. In the figure, two second lookup tables are identified as corresponding to each of the gamma curves, with each of the two lookup tables corresponding to different values of data resolution. However, it should be appreciated that implementations are possible in which only one, or more than two, second lookup tables correspond to each of the gamma curves. Moreover, implementations are possible in which the number of second lookup tables which correspond to a gamma curve varies.

Each of the second lookup tables illustrated in FIG. 4A has an index portion 303, and an entry portion 304. The index portion is used to locate a particular entry which corresponds to a particular pixel value or pixel component value. Although the index portion 303 is explicitly shown in FIG. 4A, it should be appreciated that this portion may be explicit or implicit.

Figure 4B:
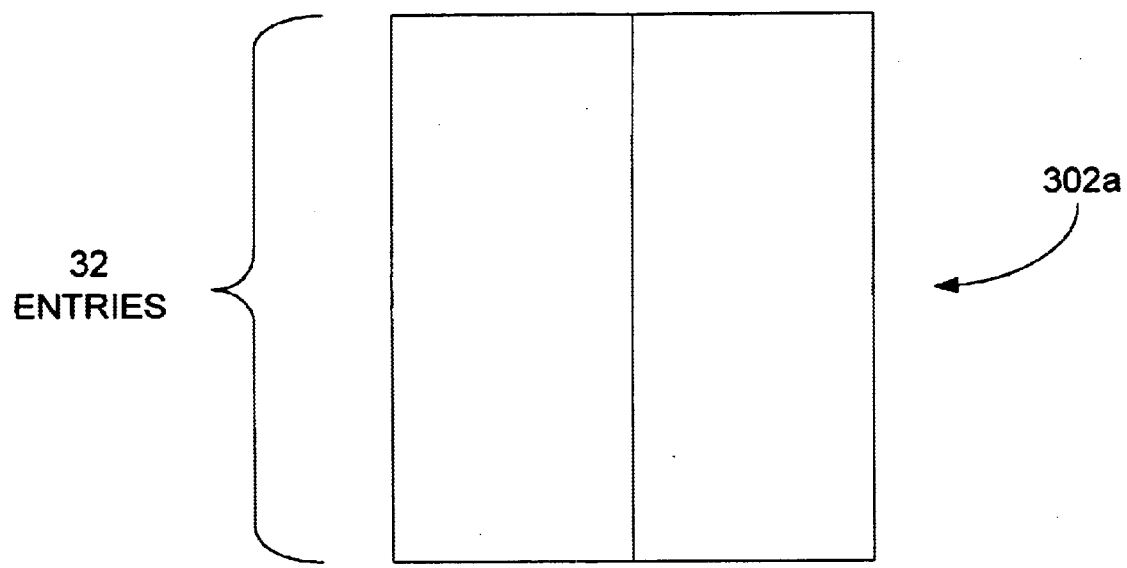
FIGS. 4B–4C are examples of implementations of gamma correction curves as lookup tables in accordance with implementations of the subject invention.
Figure 4C:
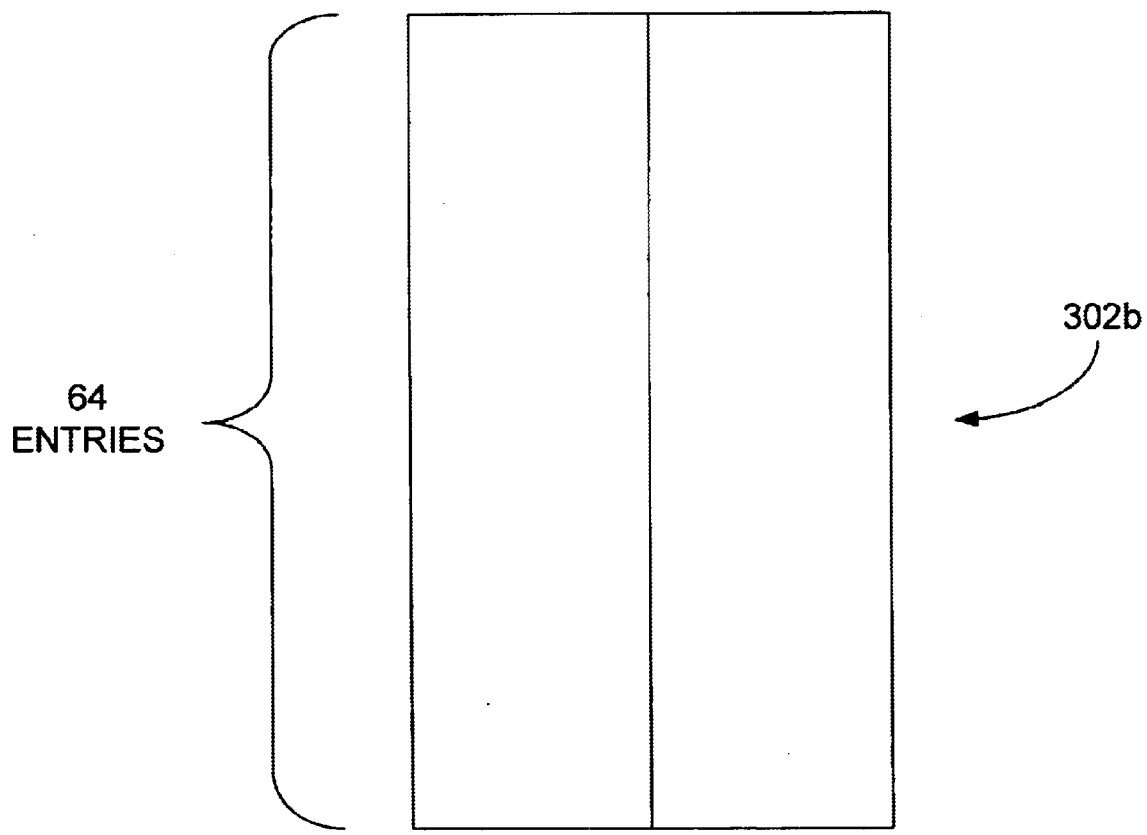

FIGS. 4B and 4C illustrate implementation examples of the second lookup tables. FIG. 4B illustrates an implementation example of a second lookup table 302a for a pixel or a pixel component comprising 5 binary bits. Since a pixel or pixel component of 5 binary bits has 32 possible values, there are 32 entries in the table, one for each of the possible values.

FIG. 4C illustrates an implementation example of a second lookup table 302b for a pixel or pixel component comprising 6 binary bits. Since such a pixel or pixel component has 64 possible values, there are 64 entries in the table, one for each of the possible values.

Figure 5A:
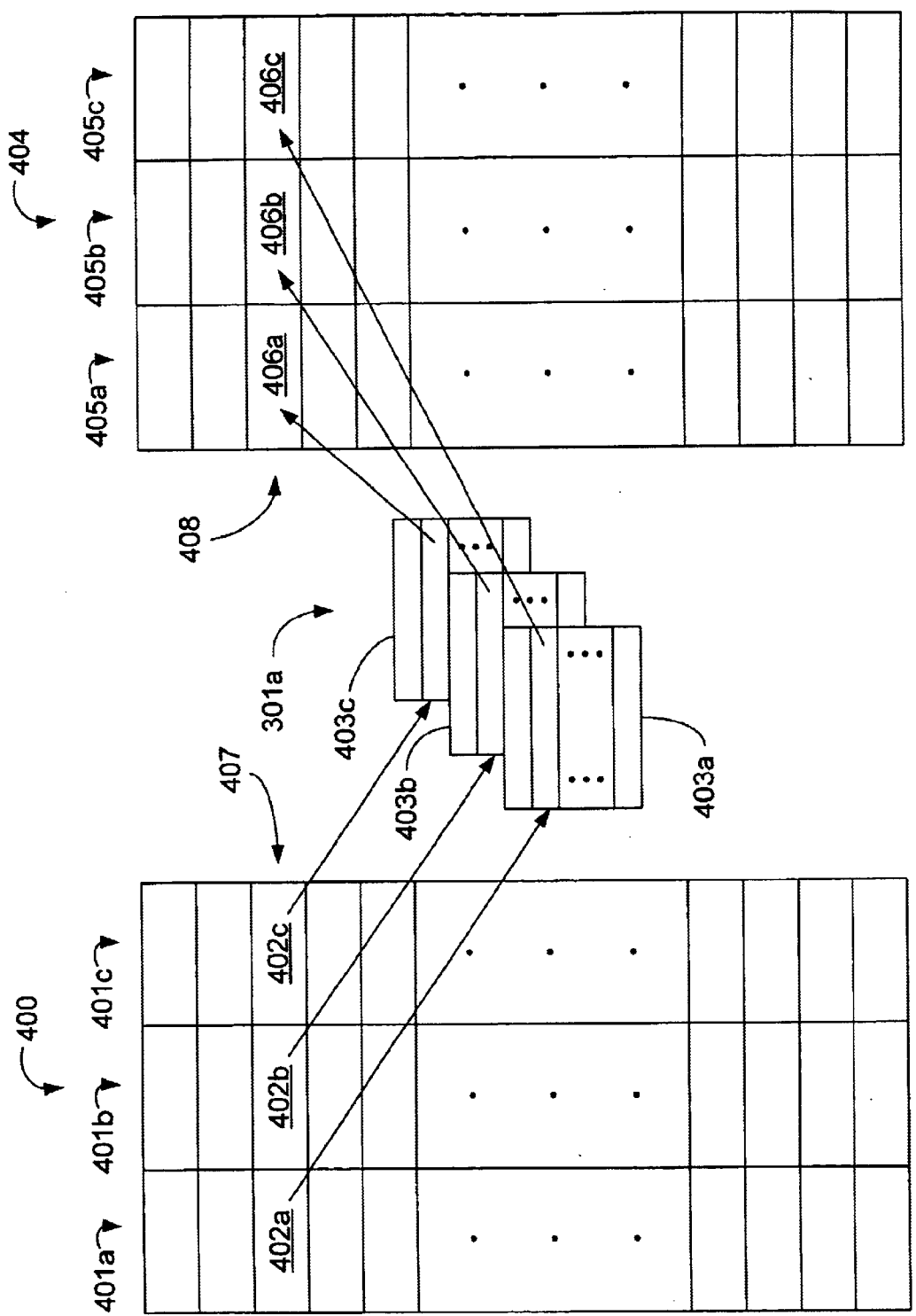
FIG. 5A is a diagram illustrating the process of determining a pixel lookup table from one or more pixel component lookup tables in accordance with one embodiment of the subject invention.

FIG. 5A illustrates the process of pre-computing lookup table 5 in one implementation of the embodiment of FIG.

1B. In this implementation, gamma curves 6 are implemented in the form of second lookup tables 301a. First, a table 400 is formed of entries for all or substantially all possible pixel values. Second, a table 404 is formed by using each of the pixel values in table 400 as an index to one of the second lookup tables 301a to obtain corrected pixel values which replace the original pixel values.

In this implementation, each pixel of table 400 has a plurality of components, and each pre-computed pixel of table 404 has the same plurality of components. In the example illustrated in FIG. 5A, each of the pixels of table 400 has 3 components, identified respectively with numerals 401a, 401b, and 401c, and each of the pre-computed pixels of table 404 has 3 components, identified respectively with numerals 405a, 405b, and 405c, but it should be appreciated that examples are possible in which each pixel is represented by more than or less than 3 components.

In this implementation, not all of the components of a pixel are pre-computed with the same second lookup table. Instead, as illustrated in the figure, different pixels are pre-computed with different second lookup tables. In the example illustrated in FIG. 5A, each of the three components 401a, 401b, 401c are pre-computed with different second lookup tables, identified respectively with numerals 403a, 403b, and 403c, but it should be appreciated that examples are possible in which some of the components are pre-computed with the same second lookup table.

An example of the process of pre-computing one of the pixels of table 400 will now be described. The pixel to be pre-computed is identified with numeral 407 in FIG. 5A. As illustrated, the pixel 407 has three components, identified respectively with numerals 402a, 402b, and 402c. Component 402a is individually pre-computed using second lookup table 403a; component 402b is individually pre-computed using second lookup table 403b; and component 402c is individually pre-computed using second lookup table 403c. The pre-computed components 406a, 406b, and 406c form a corrected pixel 408 which is the gamma-corrected rendering of pixel 407. Consequently, it is stored in a location in table 404 corresponding to that of pixel 407 in table 400, i.e., is it stored in the location in table 404 having the same index as the location of pixel 407 in table 400.

More specifically, in the foregoing process, component 402a is used to index second lookup table 403a. The indexed value in that table represents the gamma-corrected rendering of component 402a. The corrected value, identified with numeral 406a, is then stored in the location of table 404 corresponding to component 402a.

Similarly, component 402b is used to index second lookup table 403b. The indexed value in that table represents the gamma-corrected rendering of component 402b. The corrected value, identified with numeral 406b, is then stored in the location of table 404 corresponding to component 402b.

Finally, component 402c is used to index second lookup table 403c. The indexed value in that table, identified with numeral 406c, is then stored in the location of table 404 corresponding to component 402c.

Once it has been pre-computed, table 404 then becomes look-up table 5 in the foregoing embodiments.

Figure 5B:
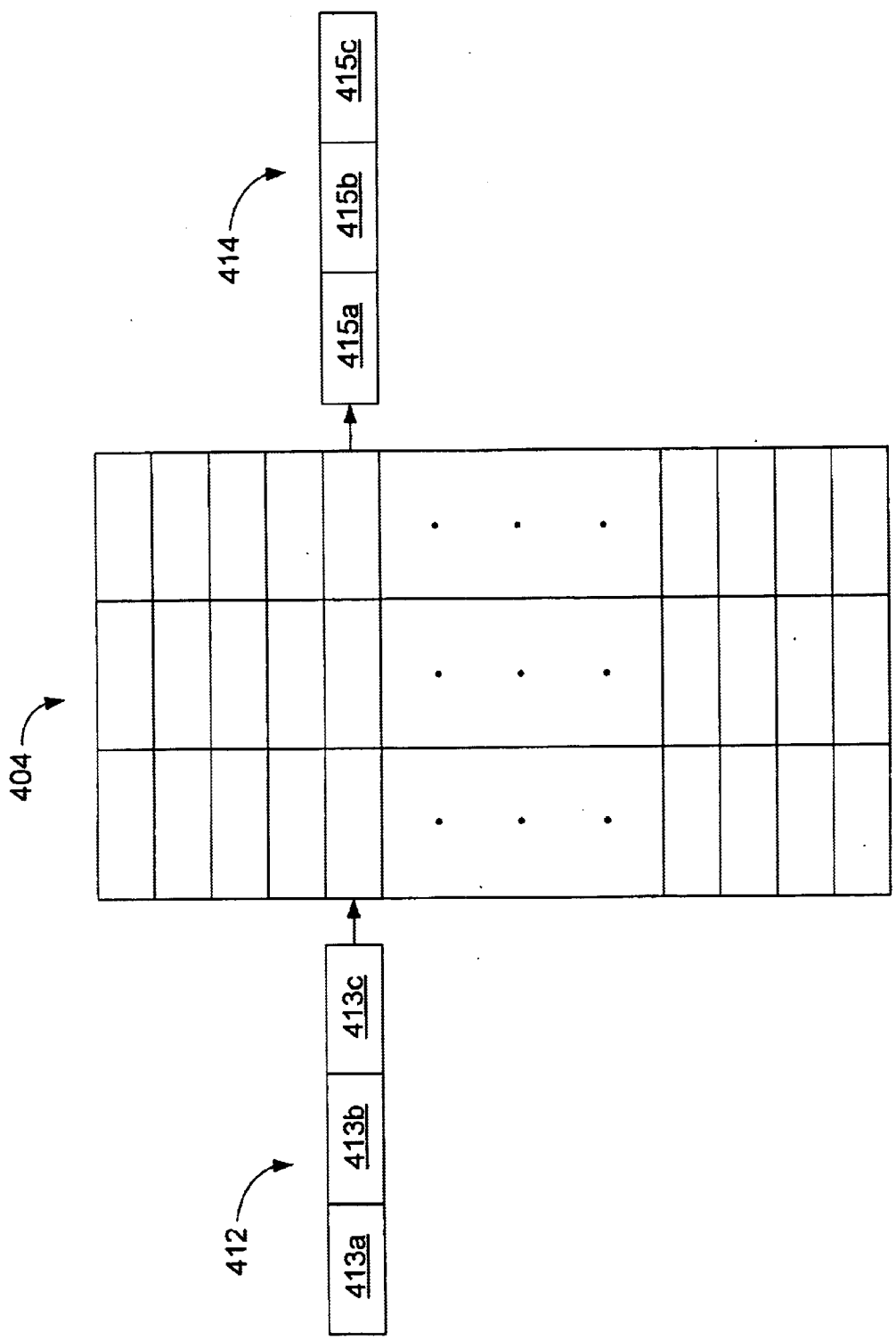
FIG. 5B is a diagram illustrating the process of indexing a pixel lookup table in accordance with one embodiment of the subject invention.

FIG. 5B illustrates one implementation of the process of using lookup table 404 in real-time to gamma correct pixels originating from source 2 in the FIG. 1B embodiment. An incoming pixel, identified with numeral 412, is used as an index to table 404. The indexed value, identified with numeral 414, becomes the gamma-corrected rendering of pixel 412.

Note that each of the three components of pixel 412 in this implementation, identified with numerals 413a, 413b, and 413c, are gamma-corrected through a single access to table 404. More specifically, the indexed value 414 in the table also has three components, identified with numerals 415a, 415b, and 415c. Each of these components 415a, 415b, and 415c represents a gamma-corrected rendering respectively of the components 413a, 413b, and 413c. Each of these gamma-corrected components 415a, 415b, and 415c are accessed through a single access to lookup table 404.

Figure 1C:
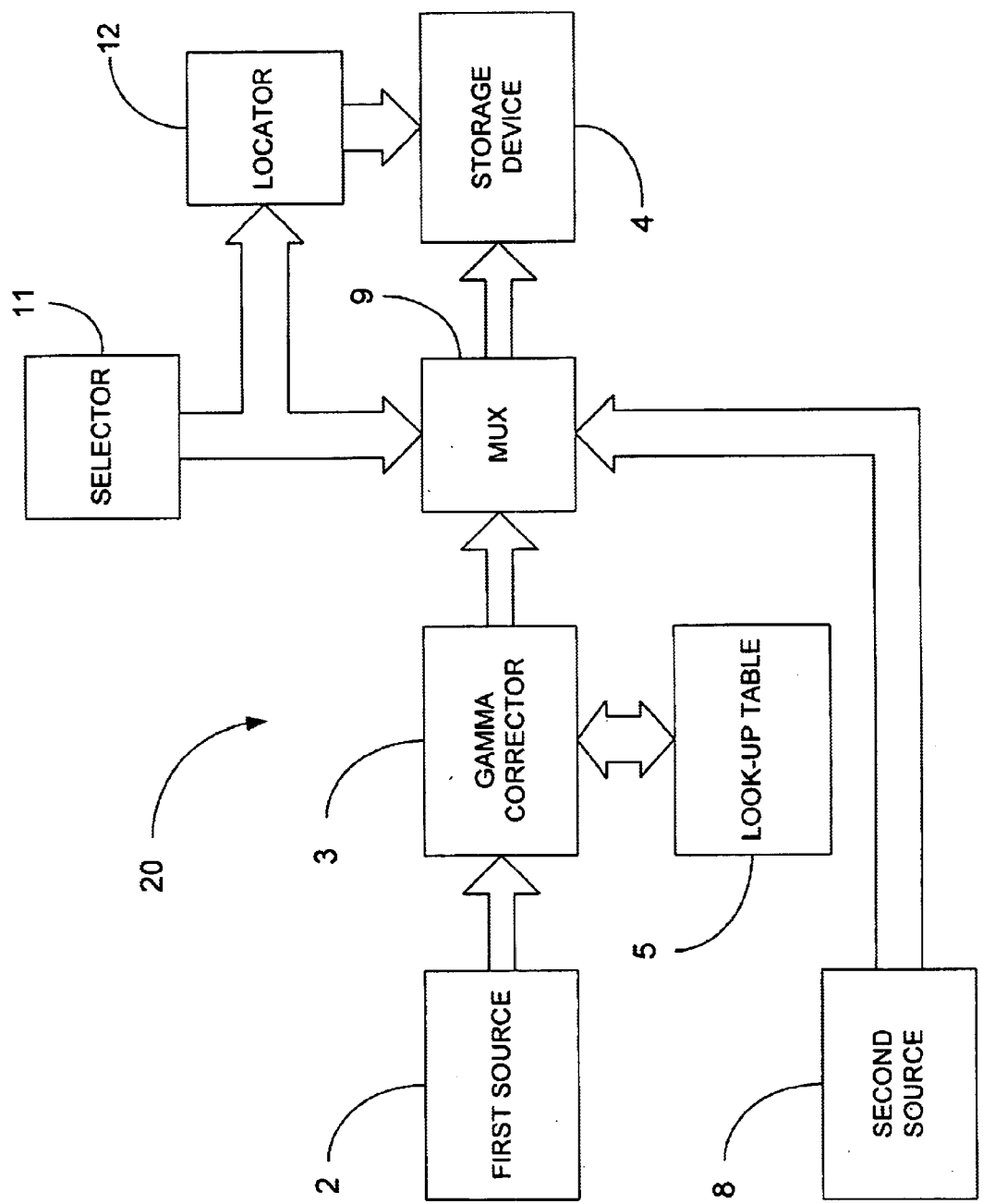
FIG. 1C is a block diagram of a third embodiment of the present invention.

A third embodiment of the subject invention is illustrated in FIG. 1C. In this figure, relative to previous embodiments, like elements are referenced with like identifying numerals. In this embodiment, first and second pixel sources, identified respectively with numerals 2 and 8, provide pixels, but only the pixels from the first source 2 are gamma-corrected in real-time by means of gamma corrector 3 and look-up table 5. The pixels from the second source 8 are either not gamma-corrected, or are gamma-corrected through means other than gamma corrector 3 and look-up table 5.

The pixels from the first source 2 are gamma corrected using gamma corrector 3 and look-up table 5 in the manner previously described. The gamma-corrected pixels from the first source 2, and pixels from the second source 8 are provided as inputs to multiplexor 9. Multiplexor 9 selects one of these two sources of pixels responsive to selector 11, and stores the same in storage device 4 beginning at a location determined by locator 12.

Selector 11 is capable of achieving first and second states indicative respectively of whether pixels originating from the first source 2 or the second source 8 are to be stored in storage device 4. When the selector 11 is in the first state, multiplexor 9 stores gamma-corrected pixels originating from the first source 2 in the storage device 4 beginning at the location determined by locator 12. When the selector 11 is in the second state, multiplexor 9 stores pixels originating from second source 8 in the storage device 4 beginning at the location determined by locator 12.

The starting address determined by locator 12 is determined responsive to the state of selector 11. When the selector 11 is in the first state, the starting address determined by locator 12 is appropriate for the corrected pixels originating from the first source 2. When the selector 11 is in the second state, the starting address determined by locator 12 is appropriate for the pixels originating from the second source 8.

In one implementation, the storage device 4 is a frame buffer for a display, the first source 2 of pixels is a source of video pixels, and the second source 8 is a source of graphics pixels. In this implementation, successive groups or subframes of video pixels from the first source 2 are gamma-corrected in real time by gamma corrector 3 and look-up table 5 in the manner described, and the corrected subframes of pixels are successively stored in a portion of the frame buffer allocated for real-time video. Graphics pixels from the second source 8 are stored in a portion of the frame buffer allocated for graphics. The graphics pixels may be stored only once in the frame buffer, or they may be successively updated and stored in the frame buffer. The contents of the frame buffer are successively displayed on the display.

Figure 1D:
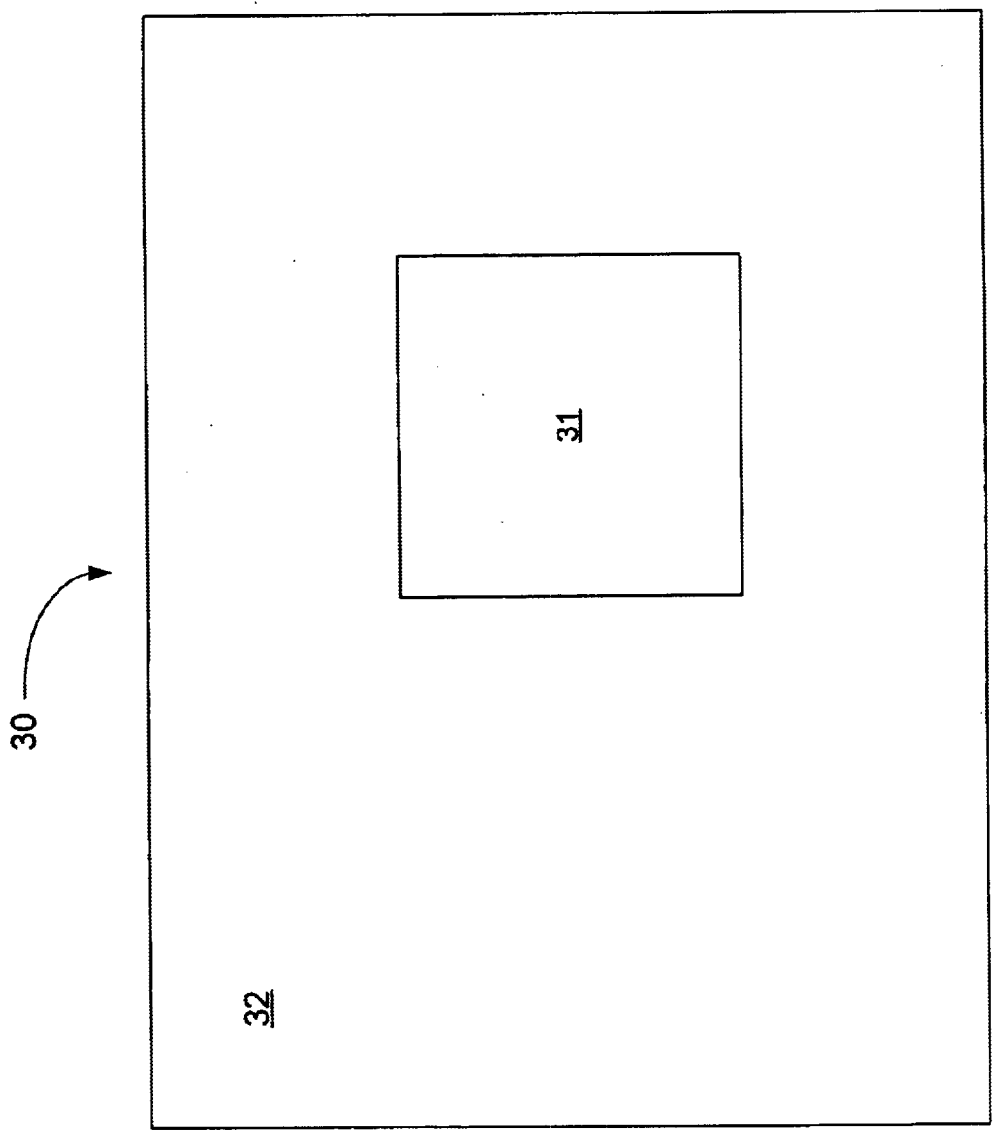
FIG. 1D illustrates a segmented display screen in which real-time video is displayed on a portion of the screen.

FIG. 1D illustrates an example of this implementation. A display 30 is shown having a real-time video portion 31, and a graphics portion 32. The gamma-corrected pixels from the first source are successively displayed within the real-time video portion 31, while the graphics pixels from the second source are displayed within the graphics portion 32.

Figure 2:
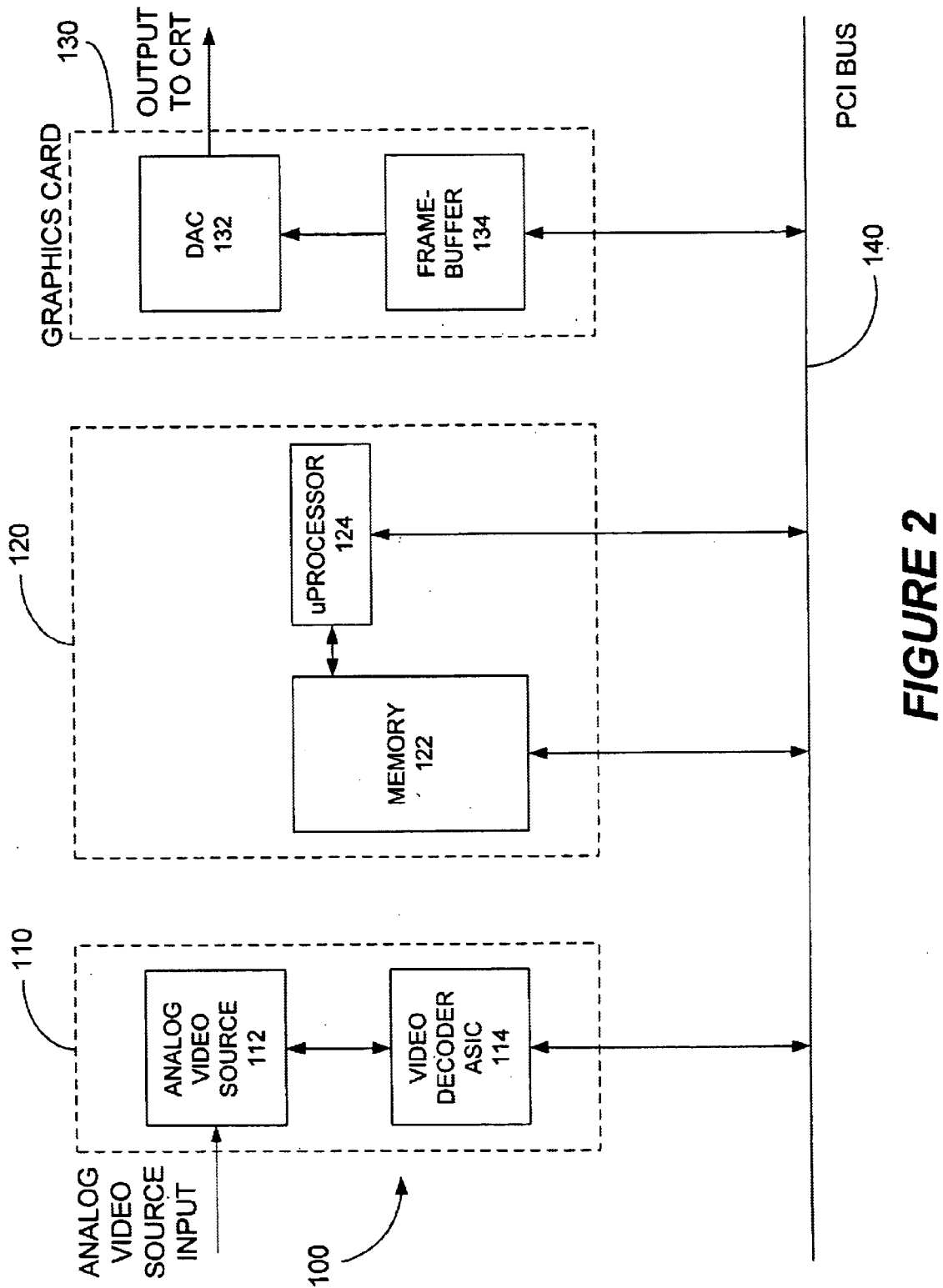
FIG. 2 is a block diagram of an implementation of the present invention.

An example implementation is shown in FIG. 2. The system illustrated consists of a video decoder 110, processing unit 120, and a graphics card 130. A bus 140, such as a PCI bus, connects these components. The video decoder is comprised of analog source input 112, like NTSC, PAL or SECAM, and a video decoder ASIC 114. The video decoder ASIC takes the analog video source input and digitizes it. The ASIC then outputs data onto the bus representative of a plurality of pixels.

The pixels are then sent to the processing unit 120. The processing unit includes memory 122 and a processor 124. A lookup table containing gamma corrected video pixel data is stored in memory. Successive ones of the incoming pixels are then used to successively index this table. When the table is indexed, a gamma corrected version of the pixel is read out. This process is repeated until gamma-corrected renderings of each of the pixels are obtained. The gamma-corrected pixels are then sent over the bus to the graphics card 130.

Note that the lookup table may be pre-computed from second lookup tables that are also stored in memory 122. The second lookup tables used to pre-compute the first lookup table upon system initialization are determined responsive to a default value of gamma. When a different value of gamma is selected, the first lookup table is recomputed using second lookup tables determined responsive to the new value of gamma.

Once the gamma corrected pixels reach the graphics card, they are stored in a frame buffer 134. The contents of the frame buffer are then sent to a DAC 132. The output of the DAC is then displayed. Note that the frame buffer may store content from a second source as well. In that case, the video data will be located within the frame buffer according to where it is to be displayed on the screen.

Figure 6A:
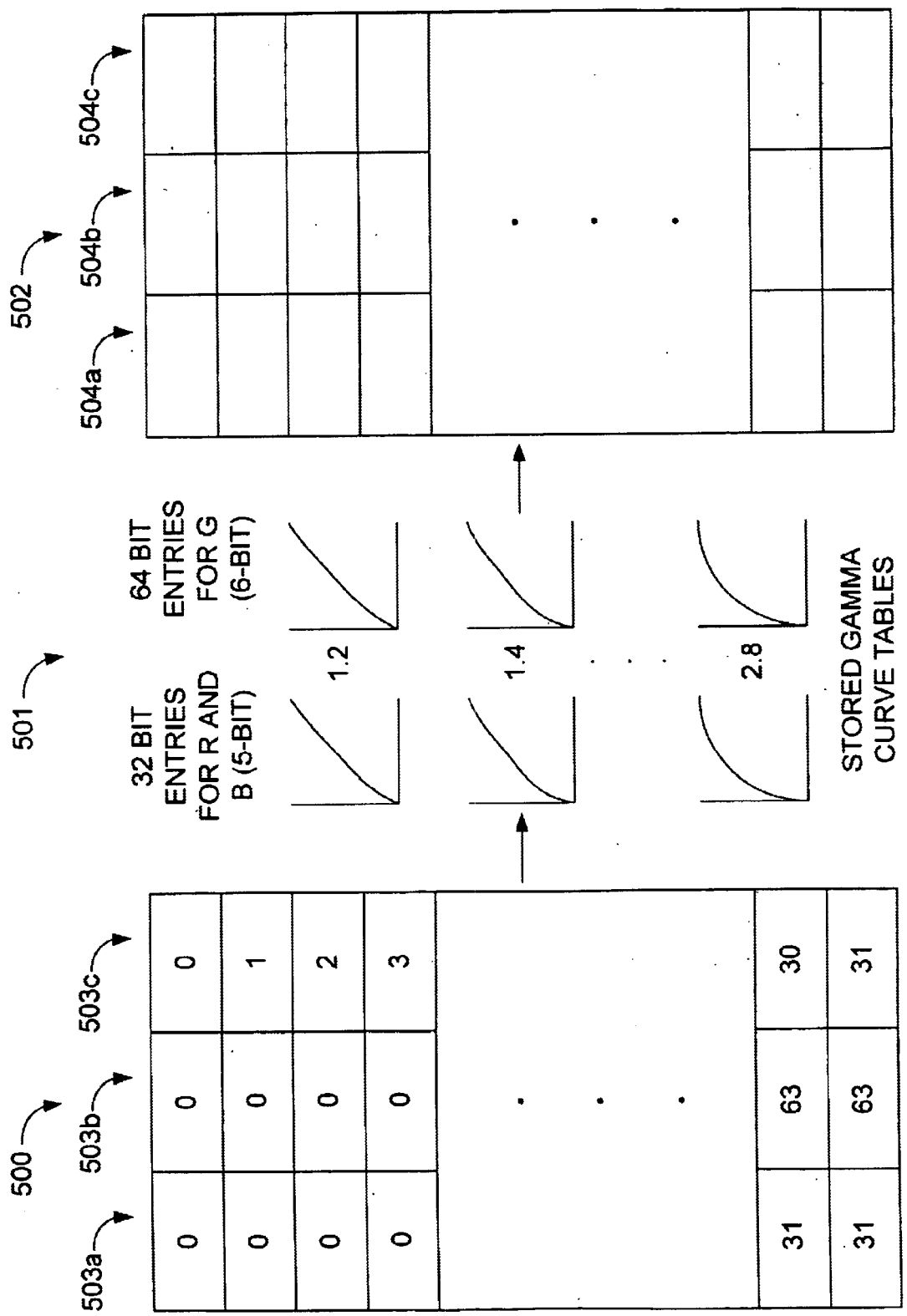
FIG. 6A is a diagram illustrating the process of determining a pixel lookup table responsive to a selected gamma value in accordance with one embodiment of the subject invention.

FIG. 6A illustrates additional detail about the structure and operation of the first and second lookup tables in this implementation example. Each pixel from the video source 2 is comprised of three fields corresponding respectively to the R, G, and B color components. The R and B components in this implementation example are both 5-bits wide and the G field is 6-bits wide. Therefore, the overall pixel width is 16-bits. There are thus 65,536 possible pixel values in this implementation example.

FIG. 6A illustrates the process of pre-computing the first lookup table in this implementation example. Table 500 is first formed containing all possible 65,536 pixel values. Column 503a represents the R component of the pixels in the table; column 503b, the G component; and column 503c, the B component. Two gamma curves from the plurality of gamma curves 501 are then selected responsive to the selected value of gamma. One of the curves is for gamma correcting the R and G components of the pixels in the table 500. The other of the curves is for gamma correcting the B component of the pixels in the table 500. Separate curves are provided because of the differing bit resolution of the components. Since the R and B components are both 5 bits wide, both can be corrected using the same gamma curve. However, the G component, being 6 bits wide, is corrected using a separate curve. The gamma curves are advantageously implemented in the form of second lookup tables, each providing corrected values of all possible pixel component values for a particular value of gamma. In the case of the R and B components, each of the second lookup tables comprise 32 values, one for each of the possible 5 bit values. In the case of the G component, each of the second lookup tables comprises 64 values, one for each of the possible 6 bit values.

The entries in table 500 are each successively gamma-corrected, one component at a time, to form table 502. In table 502, column 504a represents the R component of the corrected pixels in the table; column 504b, the G component; and column 504c, the B component.

Figure 6B:
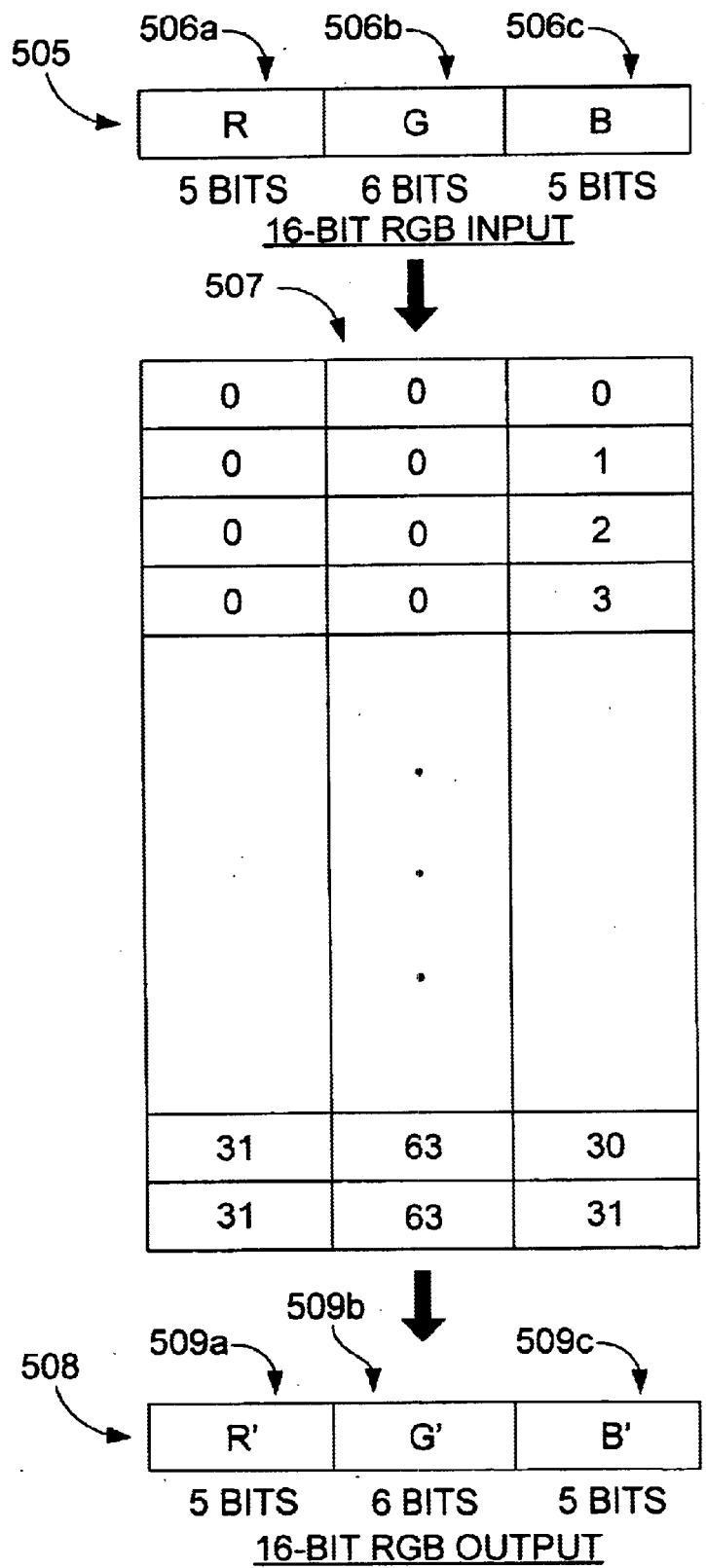
FIG. 6B is a diagram illustrating the process of indexing the pixel lookup table in accordance with one implementation of the subject invention.

FIG. 6B illustrates the process of using the first lookup table 502 in real-time to gamma correct a pixel 505. As illustrated, the pixel 505 has a 5-bit R component, identified with numeral 506a, a 6-bit G component, identified with numeral 506b, and a 5-bit B component, identified with numeral 506c. The pixel is used as an index to lookup table 507, which contains entries for all 65,536 possible pixel values. The corresponding entry in the table, identified with numeral 508, is the gamma corrected rendering of pixel 505. As illustrated, pixel 508 likewise has a 5-bit R component, identified with numeral 509a, a 6-bit G component, identified with numeral 509b, and a 5-bit B component, identified with numeral 509c.

Figure 7A:
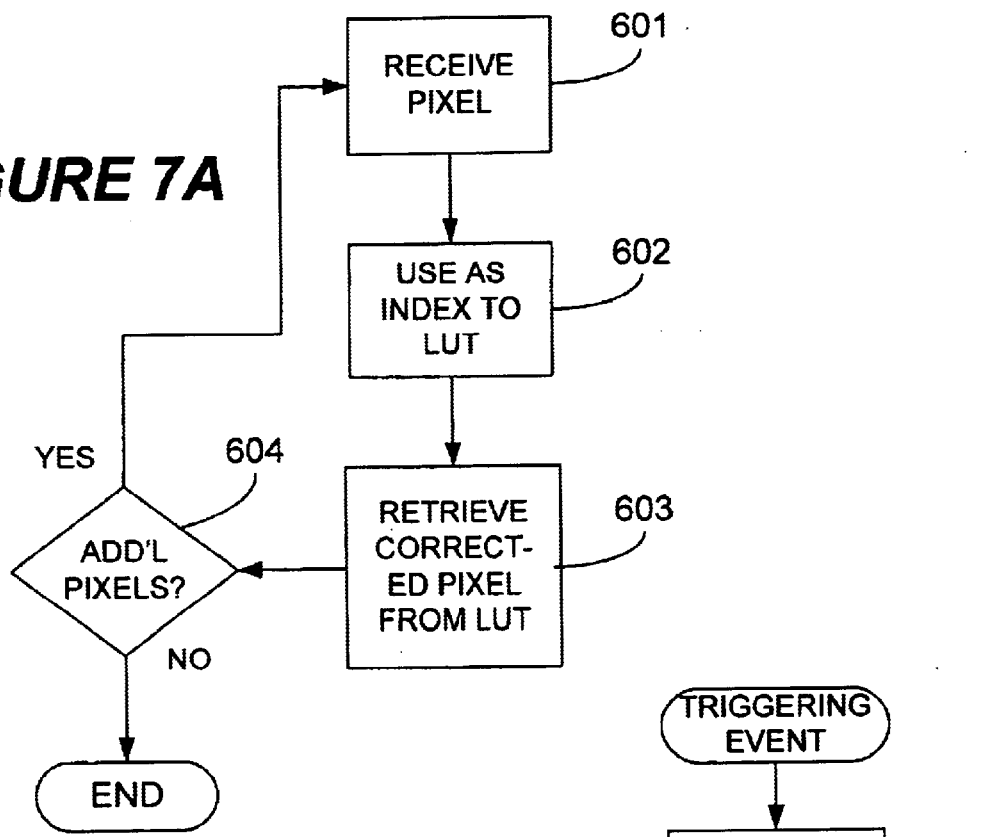
FIG. 7A is an operational flow diagram illustrating one embodiment of a method of performing gamma correction in accordance with the present invention.

FIG. 7A illustrates an embodiment of a method of gamma correction in accordance with the subject invention. In step 601, a pixel is received. In step 602, the pixel is used as an index to a lookup table configured in accordance with the subject invention. In step 603, the indexed pixel is retrieved from the lookup table and is the gamma corrected rendering of the pixel received in step 601. In one implementation, the pixel comprises a plurality of components, and a single access to the lookup table provides a pixel in which all of the components thereof are gamma corrected. In step 604, a determination is made whether there are other pixels to be gamma corrected. If so, the process is repeated beginning with step 601. If not, the process terminates.

Figure 7B:
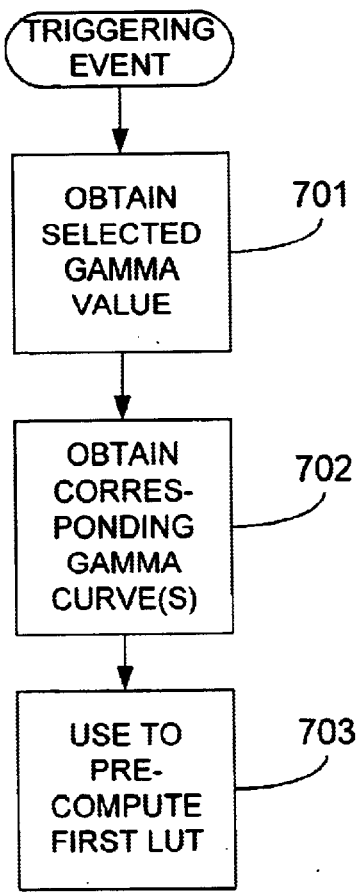
FIG. 7B is an operational flow diagram illustrating a method of determining a pixel lookup table responsive to a selected gamma value in accordance with one embodiment of the present invention.

FIG. 7B illustrates an embodiment of a method of setting up a gamma correction procedure in accordance with the subject invention. Upon the occurrence of a triggering event, which can be a user action, such as the clicking on a button or cursor, or power-up of a display, in step 701, a selected value of gamma is obtained. In the case in which the triggering event is user action, the selected value of gamma may be that selected by the user for a particular display. In the case in which the triggering event is power-up, the selected value of gamma may be a default value of gamma.

In step 702, one or more corresponding gamma curves are obtained. In one implementation, the gamma curve is representative of the relationship between input voltage and corrected input voltage illustrated in FIG. 3B. In one implementation example, in which a pixel comprises a plurality of components, more than one gamma curve may be obtained for a given gamma value, as illustrated in FIGS. 4A and 5A, to handle differing characteristics of the pixel components. In one configuration, the gamma curves are implemented in the form of second lookup tables. In step 703, the one or more gamma curves obtained in step 702 are used to pre-compute a first lookup table. In one implementation, the first lookup table has entries for substantially all pixel values. In one implementation example, in which a pixel comprises a plurality of components, each entry in the first lookup table contains gamma corrected renderings of each of the components of the corresponding pixel, such that all the components of a pixel can be gamma corrected through a single access to the lookup table. In one configuration, the first lookup table resulting from this method is used to perform gamma correction in real-time in accordance with the method of FIG. 7A.

Figure 7C:
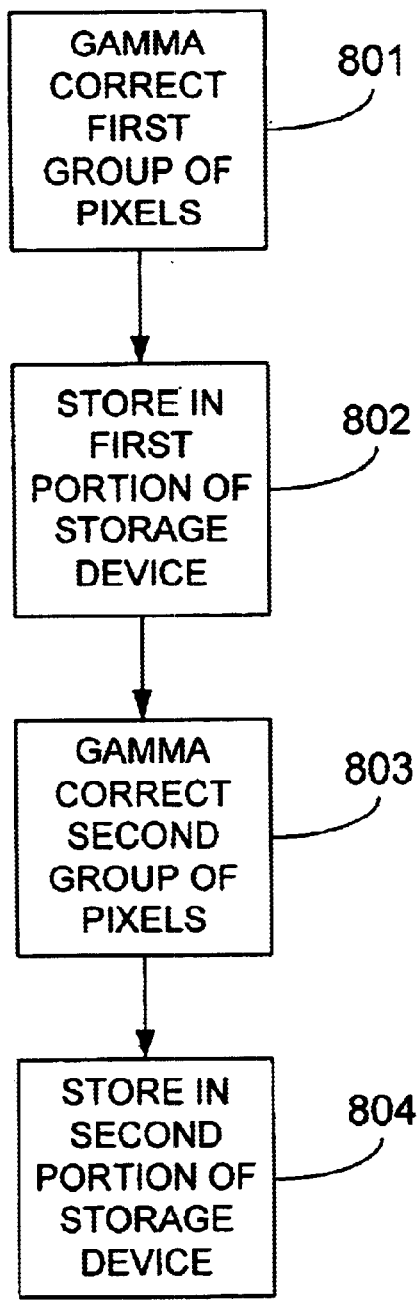
FIG. 7C is an operational flow diagram illustrating a second embodiment of a method of performing gamma correction in accordance with the present invention.

A second embodiment of a method of gamma correction in accordance with the subject invention is illustrated in FIG. 7C. In step 801, a first group of pixels is gamma corrected.

In one implementation, these pixels are gamma corrected through a first lookup table as illustrated in FIG. 5B. In step 802, these corrected pixels are stored in a first portion of a storage device. In one implementation, the storage device is a frame buffer of a display. In step 803, a second group of pixels is gamma corrected in accordance with a value of gamma which may be the same as or differ from the value of gamma utilized in gamma correcting the first group of pixels in step 801. In one implementation, these pixels are gamma corrected through a first lookup table of the type described previously. In step 804, these corrected pixels are stored in a second portion of the storage device. In one implementation, as described previously, the storage device is a frame buffer of a display. In this implementation, the contents of the frame buffer are then displayed. The process may then repeat beginning with step 801.

Figure 7D:
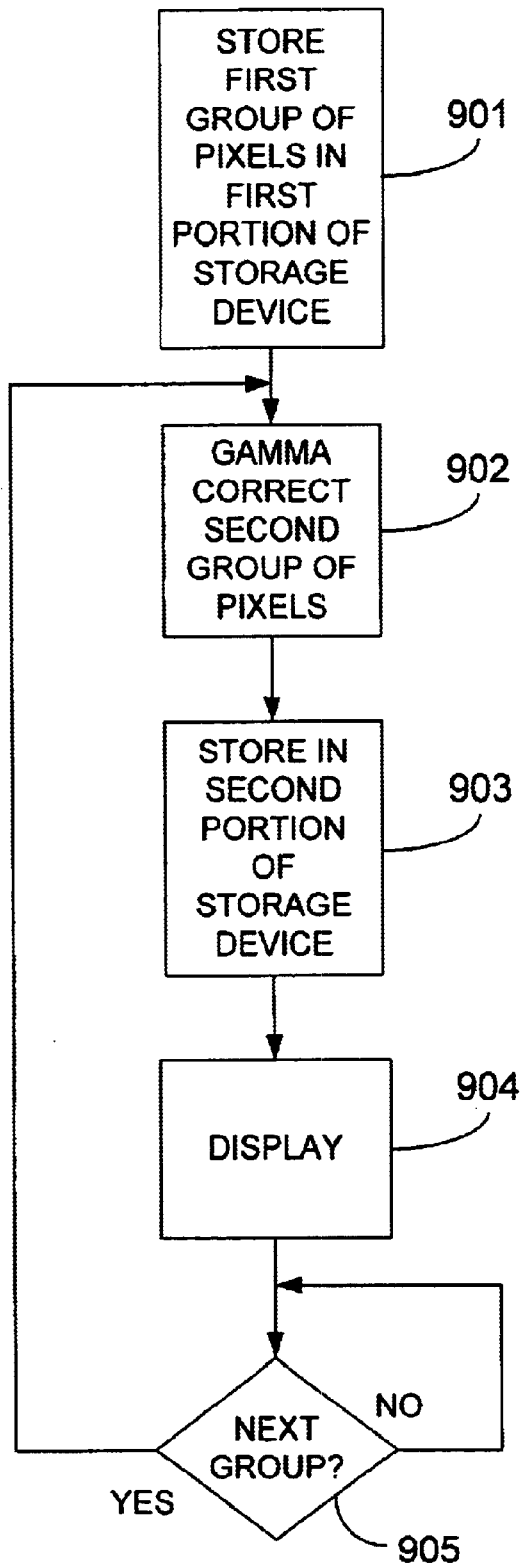
FIG. 7D is an operational flow diagram illustrating a third embodiment of a method of performing gamma correction in accordance with the present invention.

FIG. 7D illustrates a third embodiment of a method of gamma correction in accordance with the subject invention. In step 901, a first group of pixels in stored in a first portion of a storage device. In one implementation, the storage device is a frame buffer of a display. The pixels may or may not be gamma corrected. In one implementation example, the first group of pixels are graphics pixels. In step 902, a second group of pixels is gamma corrected. In one implementation, the pixels are gamma corrected utilizing a first lookup table in accordance with the subject invention. In one implementation, the second group of pixels are video pixels. In step 903, the corrected pixels are stored in a second portion of the storage device. In one implementation, as described, the storage device is a frame buffer of a display. In this implementation, optional step 904 is performed, in which the contents of the frame buffer are displayed. In step 905, a determination is made whether a next group of pixels is available. If so, a jump is made to step 902 and the process repeated beginning at this point. If not, the process loops until the next group is available. In one implementation, a group comprises all or a portion of a frame. In one implementation example, a group is a subframe of pixels within a real-time video portion of a display.

From the foregoing, it can be seen that a method and apparatus for gamma correction has been provided which is suitable for real-time applications in that all the components of a pixel can be corrected through a single access to a lookup table.

A further advantage, which facilitates real-time applications, is that, in one embodiment, there is flexibility to only gamma correct a portion or subframe of the pixels that corresponds to real-time video. The remaining pixels, e.g., graphics pixels or pixels concerning an application program, need not be gamma corrected.

An additional advantage is that, through the gamma curves, implemented in one embodiment in the form of second lookup table, there is, in one embodiment, flexibility to easily re-compute the first lookup table upon the occurrence of a triggering event, e.g., user selection of a new value of gamma.

A further advantage of one embodiment is the ability to more easily tailor the process of gamma correction to the particular characteristics of the display involved.

Yet a further advantage of one embodiment is the flexibility to gamma correct pixels in different portions of a display with different values of gamma.

While embodiments, implementations, and implementation examples of this invention have been shown and described, it should be apparent to those of skill in the art that many other embodiments, implementations, and implementation examples are possible without departing from the spirit and scope of the subject invention. Accordingly, the invention is not to be restricted, except in light of the appended claims and their equivalents.

What is claimed is:

1. A gamma correction system comprising:
    a source of pixels, each pixel having a plurality of components;
    a gamma corrector for gamma correcting the pixels utilizing a first lookup table configured such that a plurality of the components of a pixel can be gamma corrected through a single access to the first lookup table even if such components differ in value;
    a storage device for storing the corrected pixels;
    a plurality of second lookup tables, each implementing one or more gamma curves; and
    a pre-computing system for pre-computing the first lookup table by using one or more of the second lookup tables to translate uncorrected pixels or pixel components into corrected pixels or pixel components which form or are used to form entries of the first lookup table.

2. The system of claim 1 wherein the plurality of components of a pixel comprise R, G, and B components.

3. The system of claim 1 wherein the storage device is a frame buffer of a display.

4. The system of claim 3 further comprising a display, wherein the source is configured to successively provide groups of pixels, the gamma corrector is configured to successively gamma correct the groups of pixels and store the corrected pixels in the frame buffer, and the display is configured to successively display the contents of the frame buffer.

5. The system of claim 4 wherein the successive groups of pixels are video pixels.

6. The system of claim 4 wherein the successive groups of corrected pixels are stored in a first portion of the frame buffer, the system further comprising a second source of pixels and a system for storing the pixels from the second source in a second portion of the frame buffer distinct from the first, whereby the pixels in the first and second portions of the frame buffer are displayed on different portions of the display.

7. The system of claim 6 wherein the pixels from the second source are successively stored in the frame buffer.

8. The system of claim 1 wherein the pre-computing system is configured to select the one or more second lookup tables responsive to one or more selected values of gamma.

9. The system of claim 8 further comprising a gamma selector for providing the one or more selected values of gamma responsive to user input.

10. The system of claim 1 wherein each second lookup table contains entries for substantially all values of a pixel component.

11. The system of claim 10 wherein some of the components of a pixel differ by number of bits, and different ones of the second lookup tables are configured to handle the differing number of pixel component bits.

12. The system of claim 1 wherein the first lookup table contains entries for substantially all possible combinations of pixel component values.

13. The system of claim 1 wherein each entry in the first lookup table contains gamma corrected values for each component of the corresponding pixel.

14. A method of gamma correcting pixels comprising:
    pre-computing a first lookup table by using one or more second lookup tables, each implementing one or more gamma curves, to translate uncorrected pixels or pixel components into corrected pixels or pixel components which form or are used to form entries of the first lookup table;

receiving a group of one or more pixels, each of the pixels in the group having a plurality of components;

gamma correcting each of the pixels in the group such that, for each pixel in the group, a plurality of the components of the pixel are gamma corrected through a single access to the first lookup table even if such components differ in value; and storing the one or more corrected pixels.

15. A The method of claim 14 further comprising displaying the corrected pixels.

16. The method of claim 15 further comprising successively receiving, gamma correcting storing, and displaying successive groups of pixels.

17. The method of claim 14 further comprising selecting the one or more second lookup tables from a plurality of second lookup tables responsive to the one or more selected values of gamma.

18. The method of claim 17 wherein the one or more selected values of gamma are determined responsive to user input.

19. The method of claim 17 wherein the one or more selected values of gamma comprise one or more default values of gamma.

20. The method of claim 14 wherein the pre-computing step comprises using the one or more second lookup tables to form substantially all of the entries of the first lookup table.

21. A method of computing a first lookup table for use in gamma correction of pixels comprising:

forming an entry in the first table for substantially each possible combination of pixel component values;

selecting at least one second lookup table, each implementing one or more gamma curves, responsive to one or more selected values of gamma; and gamma correcting each entry in the first table using the at least one second lookup table to translate uncorrected pixels or pixel components into corrected pixels or pixel components, thereby forming the first lookup table, wherein substantially each possible combination of pixel component values is represented by an entry in the first table.

22. The method of claim 21 wherein each pixel comprises a plurality of components, and the gamma correcting step further comprises separately gamma correcting each component of a pixel value.

23. The method of claim 21 wherein at least some of the pixel components differ by number of bits, and the gamma correcting step further comprises gamma correcting a pixel component using a second lookup table selected responsive to the number of bits that comprise the component.

24. A combination of a first lookup table and one or more second lookup tables stored on a storage medium for performing gamma correction of pixels having a plurality of components, wherein the first lookup table is configured such that a plurality of the components of a pixel can be gamma corrected through a single access to the first lookup table even if such components differ in value, and each of the second lookup tables implements one or more gamma curves and is configured for use in pre-computing the first lookup table by translating uncorrected pixels or pixel components into corrected pixels or pixel components which form or are used to form entries in the first lookup table.

25. The combination of claim 24 wherein the first lookup table comprises a plurality of entries, wherein substantially each possible combination of pixel component values is represented by an entry in the first table.

26. A system for performing gamma correction of pixels comprising:

means for gamma correcting pixels having a plurality of components using a first lookup table configured such that a plurality of the components of a pixel can be gamma corrected through a single access to the first lookup table even if such components differ in value;

means for storing the first lookup table; and means for pre-computing the first lookup table using one or more second lookup tables, each implementing one or more gamma curves, to translate uncorrected pixels or pixel components into corrected pixels or pixel components which form or are used to form entries in the first lookup table.

27. The system of claim 26 wherein the first lookup table comprises a plurality of entries, and wherein substantially each possible combination of pixel component values is represented by an entry in the first table.

28. A method of performing gamma correction of pixels, each having a plurality of components, comprising:

a step for pre-computing a first lookup table using one or more second lookup tables, each implementing one or more gamma curves, to translate uncorrected pixels or pixel components into corrected pixels or pixel components which form or are used to form entries in the first lookup table;

a step for accessing the first lookup table configured such that a plurality of the components of a pixel can be gamma corrected through a single access to the first lookup table even if such components differ in value; and a step for gamma correcting a pixel having a plurality of components through a single access to the first lookup table.

29. The method of claim 28 wherein the first lookup table comprises a plurality of entries, wherein substantially each possible combination of pixel component values is represented by an entry in the first table.

30. A combination of a first lookup table and one or more second lookup tables stored on a storage medium, the first lookup table for performing gamma correction of pixels having a plurality of components, wherein the first lookup table is configured such that substantially each possible combination of pixel component values is represented by an entry in the first table, and each of the one or more second lookup tables implements one or more gamma curves and is configured for use in pre-computing the first table by translating uncorrected pixels or pixel components into corrected pixels or pixel components which form or are used to form entries in the first lookup table.

31. The combination of claim 30 wherein the first lookup table is configured such that a plurality of the components of a pixel can be gamma corrected through a single access to the first lookup table even if such components differ in value.

* * * * *

UNITED STATES PATENT AND TRADEMARK OFFICE
CERTIFICATE OF CORRECTION

PATENT NO.    : 6,727,959 B2
DATED         : April 27, 2004
INVENTOR(S)   : Michael A. Eskin It is certified that error appears in the above-identified patent and that said Letters Patent is hereby corrected as shown below:

<u>Column 13,</u>
Line 15, should read -- The method of claim 15 further comprising successively receiving correcting, storing, and displaying successive groups of pixels. --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,727,959 B2
DATED : April 27, 2004
INVENTOR(S) : Michael A. Eskin

It is certified that error appears in the above-identified patent and that said Letters Patent is hereby corrected as shown below:

Column 13,
Line 15, should read -- The method of claim 15 further comprising successively receiving, correcting, storing, and displaying successive groups of pixels. --

This certificate supersedes Certificate of Correction issued July 6, 2004.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,727,959 B2
DATED         : April 27, 2004
INVENTOR(S)   : Michael A. Eskin It is certified that error appears in the above-identified patent and that said Letters Patent is hereby corrected as shown below:

Column 13,
Line 15, should read -- The method of claim 15 further comprising successively receiving, gamma correcting, storing, and displaying successive groups of pixels. --

This certificate supersedes Certificate of Correction issued September 21, 2004.

Signed and Sealed this

Fifteenth Day of February, 2005

JON W. DUDAS
*Director of the United States Patent and Trademark Office*